United States Patent
Fogelson et al.

(10) Patent No.: US 11,347,793 B2
(45) Date of Patent: May 31, 2022

(54) USE OF DEPTH PERCEPTION AS INDICATOR OF SEARCH, USER INTEREST OR PREFERENCE

(71) Applicant: INTERDIGITAL MADISON PATENT HOLDINGS, SAS, Paris (FR)

(72) Inventors: Joel M. Fogelson, Pasadena, CA (US); Juan M Noguerol, Gardena, CA (US); Adam Balest, West Hollywood, CA (US); Guillaume Andre Roger Goussard, Burbank, CA (US)

(73) Assignee: InterDigital Madison Patent Holdings, SAS, Paris (FR)

( * ) Notice: Subject to any disclaimer, the term of this patent is extended or adjusted under 35 U.S.C. 154(b) by 640 days.

(21) Appl. No.: 15/513,101

(22) PCT Filed: Aug. 12, 2015

(86) PCT No.: PCT/US2015/044778
§ 371 (c)(1),
(2) Date: Mar. 21, 2017

(87) PCT Pub. No.: WO2016/048465
PCT Pub. Date: Mar. 31, 2016

(65) Prior Publication Data
US 2017/0300502 A1 Oct. 19, 2017

Related U.S. Application Data

(60) Provisional application No. 62/053,349, filed on Sep. 22, 2014.

(51) Int. Cl.
*G06F 16/30* (2019.01)
*G06F 16/783* (2019.01)
(Continued)

(52) U.S. Cl.
CPC ........ *G06F 16/7837* (2019.01); *G06F 16/583* (2019.01); *G06F 16/735* (2019.01); *G06F 16/9038* (2019.01); *G06T 7/12* (2017.01)

(58) Field of Classification Search
CPC .............. G06F 16/7837; G06F 16/583; G06F 16/9038; G06F 16/00; G06T 7/12
See application file for complete search history.

(56) References Cited

U.S. PATENT DOCUMENTS 8,041,155 B2   10/2011  Mihara et al.
8,421,796 B2    4/2013  Song et al.
(Continued)

FOREIGN PATENT DOCUMENTS

CN   101398851 A   4/2009
CN   101510291 A   8/2009
(Continued)

OTHER PUBLICATIONS

Article entitled "Learn to Personalized Image Search from the Photo Sharing Websites", by Sang et al., dated Aug. 2012 (Year: 2012).*
(Continued)

*Primary Examiner* — Mahesh H Dwivedi
(74) *Attorney, Agent, or Firm* — Jerome G. Schaefer

(57) ABSTRACT

A method and apparatus are provided. The method provides display of preference information using depth perception, such as on a three dimensional display or in a virtual reality space. Objects are identified in an image or image sequence and assigned relevance information based on the preference information. Objects that are favored are shown in foreground planes of the display, to varying degrees based on the strength of the preference. Objects that are disfavored are shown in background planes of the display, also to varying degrees based on the strength of the preferences. Unidentified or neutral objects are shown at a base level, neither
(Continued)

foreground nor background. An exemplary embodiment is provided for a movie database application with various actors shown pushed in or out. Another embodiment allows a user to adjust the plane of the objects to alter his preferences.

19 Claims, 3 Drawing Sheets

(51) Int. Cl.
  *G06F 16/583* (2019.01)
  *G06F 16/9038* (2019.01)
  *G06F 16/735* (2019.01)
  *G06T 7/12* (2017.01)

(56) References Cited

U.S. PATENT DOCUMENTS

| | | | | |
|---|---|---|---|---|
| 8,549,436 B1* | 10/2013 | Capriati | ................ | G06F 3/0486 |
| | | | | 715/776 |
| 8,990,201 B1* | 3/2015 | Johnston | ............ | G06F 16/3322 |
| | | | | 707/723 |
| 2007/0058865 A1* | 3/2007 | Li | ........................ | G06K 9/6224 |
| | | | | 382/173 |
| 2007/0070066 A1* | 3/2007 | Bakhash | ............... | G06F 3/0482 |
| | | | | 345/419 |
| 2007/0288432 A1* | 12/2007 | Weltman | .............. | G06F 16/583 |
| | | | | 707/E17.02 |
| 2009/0080698 A1* | 3/2009 | Mihara | ................ | G06T 11/206 |
| | | | | 382/103 |
| 2010/0262616 A1 | 10/2010 | Eskolin et al. | | |
| 2011/0055203 A1* | 3/2011 | Gutt | ........................ | G06F 16/54 |
| | | | | 715/848 |
| 2011/0063288 A1 | 3/2011 | Valadez | | |
| 2011/0305437 A1 | 12/2011 | Sakaguchi et al. | | |
| 2012/0041952 A1* | 2/2012 | Sohma | ................ | G06F 16/9038 |
| | | | | 707/E17.089 |
| 2012/0274629 A1 | 11/2012 | Baek | | |
| 2013/0011062 A1* | 1/2013 | Conwell | ............... | G06K 9/0063 |
| | | | | 382/173 |
| 2013/0027557 A1* | 1/2013 | Hirai | ................... | G06K 9/00791 |
| | | | | 348/148 |
| 2013/0060812 A1* | 3/2013 | Rothschild | .......... | G06F 16/9038 |
| | | | | 707/771 |
| 2013/0076736 A1 | 3/2013 | Seol et al. | | |
| 2014/0118343 A1* | 5/2014 | Takami | ................... | G06T 15/20 |
| | | | | 345/419 |
| 2014/0168205 A1* | 6/2014 | Naveh | ..................... | G06T 13/20 |
| | | | | 345/419 |
| 2014/0201666 A1* | 7/2014 | Bedikian | ............. | G06F 3/04815 |
| | | | | 715/771 |
| 2015/0016712 A1* | 1/2015 | Rhoads | ................... | G06T 17/00 |
| | | | | 382/154 |

FOREIGN PATENT DOCUMENTS

| | | |
|---|---|---|
| GB | 2365300 | 2/2002 |
| JP | 2002157269 A | 5/2002 |
| JP | 2003529156 A | 9/2003 |
| JP | 2009080580 A | 4/2009 |
| JP | 2010157073 A | 7/2010 |
| WO | WO0173596 | 10/2001 |

OTHER PUBLICATIONS

ISR for PCT/US2015/044778 dated Oct. 8, 2015.
Hiroshi Sako et al., "Visualisation Method for "Glance-Over" Browsing In Document Retrieval" Irish Machine Vision and Image Processing Conference. vol. 30 No. 31. 2005.

* cited by examiner

USE OF DEPTH PERCEPTION AS INDICATOR OF SEARCH, USER INTEREST OR PREFERENCE

This application claims the benefit, under 35 U.S.C. § 365 of International Application PCT/US2015/044778, filed Aug. 12, 2015, which was published in accordance with PCT Article 21(2) on Mar. 31, 2016 in English and which claims the benefit of U.S. provisional patent application No. 62/053,349, filed Sep. 22, 2014 in its entirety.

TECHNICAL FIELD

The present principles relate to the use of depth perception on a three-dimensional (3D) display or in a virtual reality (VR) space to indicate search results, user preferences or interest.

BACKGROUND

Image segmentation techniques are often used to separate different objects in images or video sequences. Object recognition techniques allow these objects to be identified or tracked within an existing sequence. In the medical imaging field, objects that appear to be tumors can be identified from medical video sequences by defining what a tumor may look like, and then searching for objects that reasonably fit this description in the sequence But, if a user wants to search for an object, or some subject and isn't sure which media asset the subject might be contained in, or isn't certain of the exact appearance of the subject, image segmentation and object recognition techniques will fail.

Another challenge is to present the results of such a search in a meaningful way to a user, such that he can quickly identify those objects that he is looking for.

A need exists to identify subjects in video images or sequences and present them to a user in a way that also displays those items of interest in the image to a user.

SUMMARY

These and other drawbacks and disadvantages of the prior art are addressed by the present principles, which are directed to using depth perception on a three-dimensional (3D) display or in a virtual reality (VR) space to indicate search results, user preferences or interest.

According to an aspect of the present principles, there is provided a method for displaying preference information in a three dimensional or virtual reality space. The method includes a step for receiving preference information. The method further includes a step for generating relevance data for at least one segmented and identified object in input image data, based on the preference information. The method further includes a step for displaying the image data in at least two planes based on the generated relevance data.

According to another aspect of the present principles, there is provided an apparatus. The apparatus comprises a processor configured to receive preference information and generate relevance data for at least one segmented and identified object from input video data based on the preference information. The apparatus further comprises a display processor to receive the relevance data and produce data to display the image data in at least two planes based on the relevance data.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to a method and apparatus for displaying preference information in a three dimensional or virtual reality space. The information is displayed using depth perception, such that those items of most interest are displayed in planes appearing in the foreground, or closer to the viewer. Those items that are disliked are displayed in planes appearing in the background, or farther from the viewer. The foreground and background planes can vary to the degree that they are forward or backward, based on the degree of relevance or interest to the user.

Figure 1:
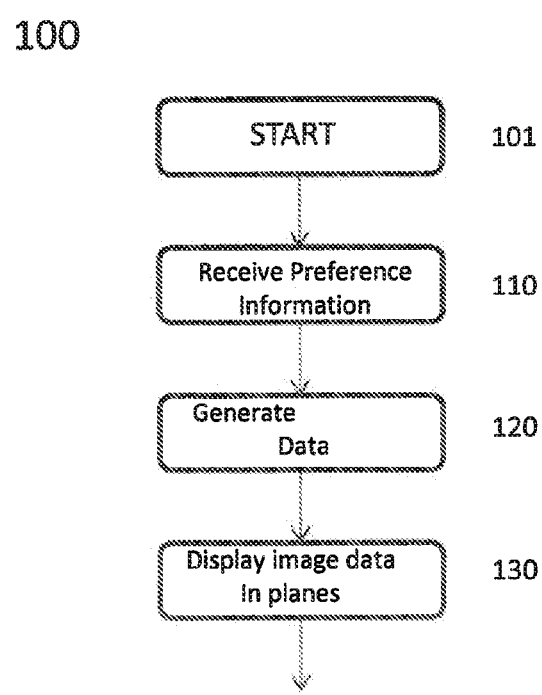
FIG. 1 shows a flow diagram of an exemplary method 100 for displaying preferences using a plurality of planes in a three dimensional or virtual reality space.

One embodiment of the present principles is shown in FIG. 1 which is a flow diagram of a method 100 for displaying preferences using a plurality of planes in a three dimensional or virtual reality space. The method commences with a start at step 101, and proceeds to step 110 for receiving preference information. Preference information can comprised user input(s), stored profile information, or other such data. Preference information can also comprise some combination of this aforementioned information, or be based on this information. The method then proceeds to step 120 for generating relevance data for at least one segmented and identified object in input image data, based on the preference information from step 110. The method then proceeds to step 130 for displaying the image data in at least two planes based on the generated relevance data from step 120.

Figure 2:
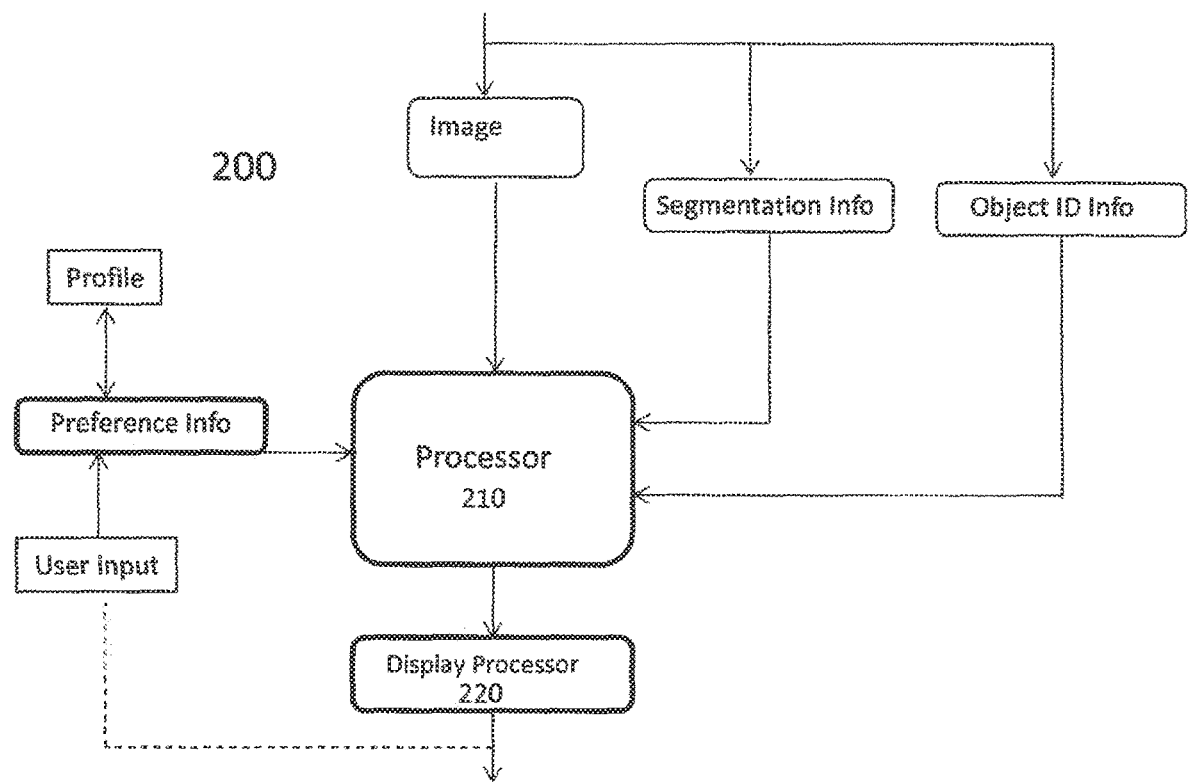
FIG. 2 shows one embodiment of an apparatus for displaying preferences using a plurality of planes in a three dimensional or virtual reality space.

FIG. 2 shows one exemplary embodiment of an apparatus 200 for displaying preferences using a plurality of planes in a three dimensional or virtual reality space. The apparatus comprises a processor 210 configured to receive preference information and generate relevance data for at least one segmented and identified object from input video data based on the preference information. Preference information can comprise user input(s), stored profile information, or other such data. Preference information can also comprise some combination of this aforementioned information, or be based on this information. The segmentation information and object identification information can be generated locally as part of the present principles, or can be supplied by an external source. The apparatus further comprises a display processor 220 that is in signal connectivity with the relevance data output of processor 210 and produces data to display the image data in at least two planes based on the relevance data.

The apparatus can also optionally receive input from the user who can adjust the plane of objects in an image that is then fed back to the user preferences to adjust his or her preferences for future use.

As previously stated, the present principles are directed to using depth perception as an indicator of search results, user interest, or preferences. The depth information is displayed in a three dimensional (3D) or virtual reality (VR) space, assigned to at least one object in an image or image sequence that has been segmented and identified in the image(s). When referring to an image in the following description, it should be understood that the process can also be applied to an image sequence comprised of individual images.

Preference information is used to generate the depth information, also referred to as relevance information. The preference information can be derived in several ways. It can be based on user input, such as, for example, a search query. It can be based on user profile information, or it can be based on other information, for example some externally supplied information that indicates relevancy of objects in an input image or image sequence.

Segmentation information is also used to break an image into different objects. The segmentation information can be generated locally as part of the present principles, or can be supplied by an external source. Edge detection algorithms can be used to detect various objects and break them up like pieces of a jigsaw puzzle in the image.

Object identification or object recognition information is used to identify objects that have been segmented from the image. The object identification information can also be generated locally as part of the present principles, or can be supplied by an external source.

In at least one exemplary embodiment, a set of data from an external source can indicate actors appearing in certain movie scenes. One example of this is DigitalSmiths data.

The preference information, along with the segmentation information and object identification information in the input image, is used to generate relevance information for at least one of the objects in the input image. The preference information can indicate how interested a user is in an object, its relevance to the user or some other metric that the preference information shows.

Objects that are favored are shown in foreground planes of the display, to varying degrees based on the strength of the preference. Objects that are disfavored are shown in background planes of the display, also to varying degrees based on the strength of the preferences. Unidentified or neutral objects are shown at a base level, neither foreground nor background.

The relevance information for an object or objects in an image is used to display that object in a video plane that is indicative of user interest relative to other objects in the image, or relative to the background. Unidentified objects can be left at a base level that appears to neither be pushed in nor pushed out. For example, if a user is very interested in a particular object because, for example, the user has searched for this object, it can be shown in a foreground plane. If another object is slightly less relevant than the first, but there is still some user interest, it may be shown in a plane that is slightly less foreground than the first object, but still in the foreground relative to neutral parts of the image, in which there is no indicated relevance. If, for example, a user profile indicates a strong dislike for something, and it also is contained in the image, it will appear in a plane that is shown in the background to indicate user disfavor. The rendering of the various objects with regard to the plane they appear is adjusted based on the preference information.

Figure 3:
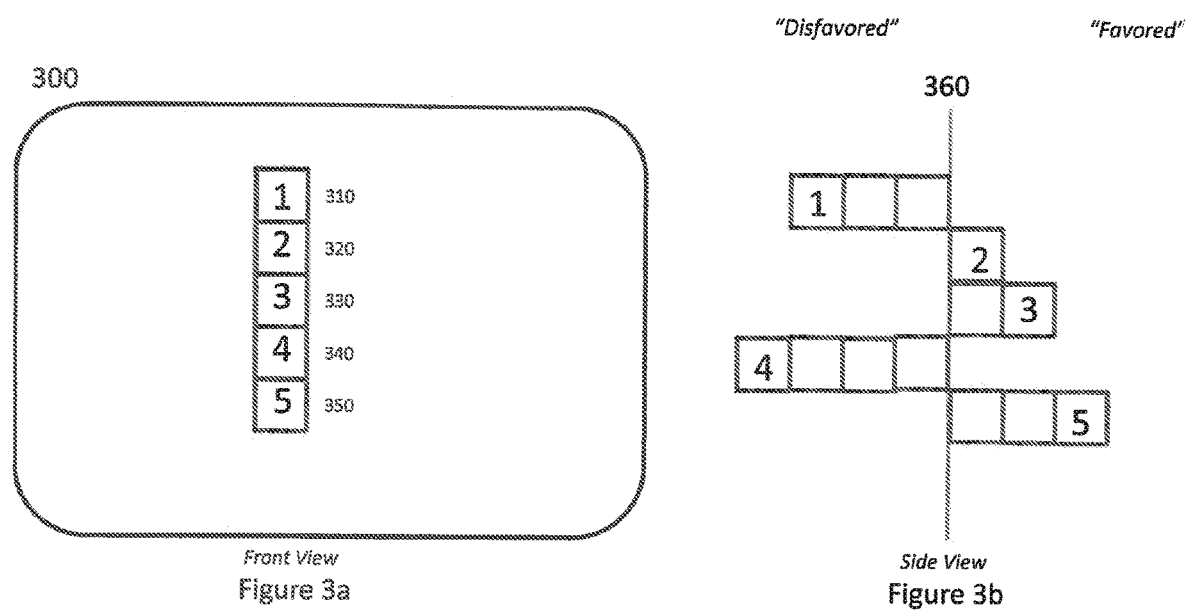
FIGS. 3a and 3b show a conceptual view of a three dimensional image with a plurality of blocks.

An example of foreground and background parts of an image in a 3D or VR space is indicated in FIG. 3. FIG. 3a shows a front view 300 of five blocks in an image, labelled 1 through 5. A user is most interested in, or likes, block 5 350, then block 3 330, then block 2 320. The user is not interested in block 1 310, and very not interested in block 4 340.

FIG. 3b shows a conceptual side view 360 of the image under the present principles. Because the user is most interested in block 5 350, it is "pushed forward", or shown in the foreground the closest. Next most forward is block 3 330, then block 2 320.

The user is not interested in block 1 310, so it is shown slightly "pushed back" into the background of the image. And the user is very not interested in block 4 340, so it is shown "pushed back" even farther into a background plane of the image.

One example of an embodiment of the present principles can be illustrated through an example of a movie query application. A user would like to search a movie library (either local or online) for movies by Actor A. He also has a profile stored that indicates what actors/actresses he favors and which he disfavors. The profile can also indicate other preference information, such as genre, director, etc.

Once the user searches for movies by Actor A, the user receives a series of search results, in the form of images, clips or trailers, for movies that include Actor A. In these results, Actor A can be pushed into the foreground because of the user request from the search. However, because other preferences from the profile information are used, the clips can also show other actors/actresses in each of the results, and their image can appear to be pushed forward or backward, based on the user preference for that actor.

If the user sees lots of foreground actors/actresses, that user may be eager to watch this movie because it contains many of his favorite stars. If, however, he sees a movie with Actor A in the foreground, but the film's other actors pushed back, he may decide he doesn't wish to view the film despite his desire to see an Actor A movie because of his dislike of the remaining cast.

A similar idea can be applied to media asset titles, where those titles that are most appealing to a user can be pushed into the foreground and the unappealing titles pushed back.

In another exemplary embodiment, once the display is shown with objects, such as actors, in their various planes, a user may alter his preferences by directly adjusting the plane that the object, or actor, is in. For example, in the Actor A embodiment above, if a user decides that he has changed his opinion of one of the objects in an image, he can push it back or pull it forward, and his preference information or profile will automatically be updated and now influence the search in a new way.

In a three dimensional display under the present principles, the various objects appear closer or farther in various planes in the image. In a virtual reality space, one can imagine the various planes like filing cabinets, with some drawers sticking out to varying degrees and others pushed in to varying degrees. A user would be able to walk around the files and determine the degree that they are pushed in or out.

The present description illustrates the present principles. It will thus be appreciated that those skilled in the art will be able to devise various arrangements that, although not explicitly described or shown herein, embody the present principles and are included within the present principles.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope of the present principles. All such changes and modifications are intended to be included within the scope of the present principles as set forth in the appended claims.

The invention claimed is:

1. A method, comprising:
obtaining, by at least one processor, user preference information;
obtaining, by the at least one processor, segmentation information indicating two or more objects in an image;
obtaining, by the at least one processor, object recognition information identifying at least two of the two or more objects; generating, by the at least one processor, relevance data for the at least two objects, based on the user preference information and on the object recognition information; rendering, by the at least one processor, image data corresponding to the at least two objects to enable the at least two objects to appear in a respective one of a plurality of planes of a displayed image, wherein:

the rendering includes adjusting the respective one of the plurality of planes in which the at least two objects appear based on the relevance data to indicate a strength of an interest of the user in each of the two or more objects relative to other objects in the displayed image;

the plurality of planes includes a base level plane and one or more of a foreground plane or a background plane, wherein each of the plurality of planes appears to be at a respective one of a plurality of different depths in the displayed image; and the user preference information includes indicating one of a favored user preference, a neutral user preference, or a disfavored user preference for the at least two objects.

2. The method of claim 1, wherein the rendering occurs with regard to a three dimensional or virtual reality space.

3. The method of claim 1, wherein obtaining the user preference information comprises configuring, by the at least one processor, stored user preference information responsive to at least one of a user input and a stored user profile information.

4. The method of claim 3, wherein the user input comprises a search query.

5. The method of claim 1, wherein the image is included in a video and the obtaining of the object recognition information is based on a database of objects which appear in images included in the video.

6. The method of claim 1, wherein obtaining the segmentation information comprises using an edge detection process.

7. The method of claim 1, wherein the user preference information is modified based on a user input causing the adjusting by the at least one processor to alter the plane the at least one object appears in from a current one of the base level plane, the foreground plane and the background plane to a different one of the base level plane, the foreground plane and the background plane.

8. An apparatus, comprising:
one or more processors configured to:
obtain user preference information;
obtain segmentation information indicating two or more objects in an image;
obtain object recognition information identifying at least two of the two or more objects; generate relevance data for the at least two objects, based on the user preference information and on the object recognition information; and render image data corresponding to the at least two objects to enable the at least two objects to appear in a respective one of a plurality of planes of a displayed image, wherein:
the rendering includes the one or more processors being further configured to adjust the respective one of the plurality of planes in which the at least two objects appear based on the relevance data to indicate a strength of an interest of the user in each of the two or more objects relative to other objects in the displayed image; the plurality of planes includes a base level plane and one or more of a foreground plane or a background plane, wherein each of the plurality of planes appears to be at a respective one of a plurality of different depths in the displayed image; and the user preference information includes indicating one of a favored user preference, a neutral user preference, or a disfavored user preference for the at least two objects.

9. The apparatus of claim 8, wherein to render the image data the one or more processors are further configured to render the image data with regard to a three dimensional or virtual reality space.

10. The apparatus of claim 8, wherein the one or more processors are further configured to obtain the user preference information based on at least one of a user inputs or a stored user profile information.

11. The apparatus of claim 10, wherein the user input comprises a search query.

12. The apparatus of claim 8, wherein the image is included in a video and the one or more processors are further configured to obtain the object recognition information based on a database of objects which appear in images included in the video.

13. The apparatus of claim 8, wherein the one or more processors are further configured to obtain the segmentation information using an edge detection process.

14. The apparatus of claim 8, wherein the one or more processors are further configured to modify the user preference information based on a user input causing the adjusting to alter the plane the at least one object appears in from a current one of the base level plane, the foreground plane and the background plane to a different one of the base level plane, the foreground plane and the background plane.

15. A method comprising:
obtaining, by at least one processor, preference information of a user;
obtaining, by the at least one processor, segmentation information indicating two or more objects in an image;
obtaining, by the at least one processor, object recognition information identifying the two or more objects; generating, by the at least one processor, relevance data for the two or more objects, based on the preference information and on the object recognition information, wherein the relevance data indicates a preference of the user for each of the two or more objects; and rendering, by the at least one processor, image data corresponding to a displayed image including the two or more objects, each appearing to be in a respective one of a plurality of planes of the displayed image, wherein each of the plurality of planes appears to be at a respective one of a plurality of different depths in the displayed image based on a depth perception of the user; and the rendering includes adjusting the respective one of the plurality of planes in which each of the two or more objects appears based on the relevance data to indicate a strength of an interest of the user in each of the two or more objects relative to other objects in the displayed image based on the depth perception of the user.

16. The method of claim 15, wherein
the plurality of different depths comprises first, second and third depths corresponding to a base level, a background level and a foreground level in the displayed image based on the depth perception of the user; and
the plurality of planes comprises first, second and third planes appearing at the base level, the background level, and the foreground level, respectively; and
the first, second and third planes correspond to a neutral user preference, a disfavored user preference, and a favored user preference, respectively, of the user.

17. The method of claim 16, wherein the adjusting comprises, based on an input from a user, one of pushing at least one of the two or more objects from the foreground plane to the base level plane or to the background plane, or pulling the at least one of the two or more objects from the background plane to the base level plane or to the foreground plane, and modifying the user preference information to indicate a change to a less favored preference based on the pushing or to a more favored preference based on the pulling.

18. A non-transitory computer readable medium storing executable program instructions to cause a computer executing the instructions to perform a method according to claim 1.

19. The method of claim 17, wherein the adjusting comprises including the at least one of the two or more objects in that displayed image at a fourth plane appearing at a fourth depth different from the first, second and third depths and indicating a fourth user preference different from the user preferences associated with the first, second and third planes; and the fourth depth appearing to be further from the base level than the second or third depths indicates the fourth user preference is stronger than the user preferences associated with the second or third depths; and the fourth depth appearing to be closer to the base level than the second or third depths indicates the fourth user preference is weaker than the user preferences associated with the second or third depths.

* * * * *

UNITED STATES PATENT AND TRADEMARK OFFICE
CERTIFICATE OF CORRECTION

PATENT NO. : 11,347,793 B2
APPLICATION NO. : 15/513101
DATED : May 31, 2022
INVENTOR(S) : Joel M. Fogelson et al.

It is certified that error appears in the above-identified patent and that said Letters Patent is hereby corrected as shown below:

In the Specification

At Column 1, Line 5; replace "35 U.S.C. § 365" with --35 U.S.C. § 371--

Signed and Sealed this
Ninth Day of August, 2022

Katherine Kelly Vidal
*Director of the United States Patent and Trademark Office*